(12) United States Patent
Zhang et al.

(10) Patent No.: US 7,411,021 B2
(45) Date of Patent: Aug. 12, 2008

(54) POLYCARBONATE POLYESTER MOLDING COMPOSITION

(75) Inventors: Huiping Zhang, Mount Vernon, IN (US); Peter H. Th. Vollenberg, Evansville, IN (US)

(73) Assignee: SABIC Innovative Plastics IP B.V., Pittsfield, MA (US)

( * ) Notice: Subject to any disclaimer, the term of this patent is extended or adjusted under 35 U.S.C. 154(b) by 266 days.

(21) Appl. No.: 10/979,614

(22) Filed: Nov. 2, 2004

(65) Prior Publication Data

US 2005/0137358 A1  Jun. 23, 2005

Related U.S. Application Data

(60) Provisional application No. 60/530,516, filed on Dec. 18, 2003.

(51) Int. Cl.
*C08L 69/00* (2006.01)
*C08L 67/02* (2006.01)

(52) U.S. Cl. .................... 525/133; 525/148; 525/439

(58) Field of Classification Search .................. None
See application file for complete search history.

(56) References Cited

U.S. PATENT DOCUMENTS

| | | | |
|---|---|---|---|
| 2,999,835 A | 9/1961 | Goldberg | |
| 3,038,365 A | 6/1962 | Peterson | |
| 3,153,008 A | 10/1964 | Fox | |
| 3,334,154 A | 8/1967 | Kim | |
| 4,123,436 A | 10/1978 | Holub et al. | |
| 4,131,575 A | 12/1978 | Adelmann et al. | |
| 4,188,314 A | 2/1980 | Fox et al. | |
| 4,786,692 A | 11/1988 | Allen et al. | |
| 4,879,355 A | 11/1989 | Light et al. | |
| 5,017,659 A | 5/1991 | van der Groep | |
| 5,194,523 A | 3/1993 | Small, Jr. et al. | |
| 5,399,661 A | 3/1995 | Borman | |
| 5,478,896 A * | 12/1995 | Scott | 525/439 |
| 5,486,562 A | 1/1996 | Borman et al. | |
| 5,491,179 A | 2/1996 | Mason et al. | |
| 5,942,585 A | 8/1999 | Scott et al. | |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 2004/0138388 A1* | 7/2004 | Pecorini et al. | 525/439 |
| 2005/0143532 A1* | 6/2005 | Fonseca et al. | 525/439 |

FOREIGN PATENT DOCUMENTS

| | | | |
|---|---|---|---|
| EP | 0542464 | | 5/1993 |
| GB | 1559230 A | | 1/1980 |
| WO | WO 03/004561 | * | 1/2003 |
| WO | WO 03/066704 | | 8/2003 |

OTHER PUBLICATIONS

Lexan 101 Product Data Sheet; GE Plastics.*
Plastics Tech Center data sheet for Makrolon 1239.*

* cited by examiner

*Primary Examiner*—David Buttner

(57) ABSTRACT

A clear thermoplastic blend comprises from about 25 to about 90 percent by weight of low flow polycarbonate resin having a MVR (Melt Viscosity Rate) of from about 1 to about 7 cc/10 min at 300° C./1.2 kg and from about 10 to about 75 percent by weight of a polyester resin derived from the condensation of a cyclohexanedimethanol or equivalent thereof alone or with an ethylene glycol or equivalent thereof with a terephthalic acid or equivalents thereof or a combination of terephthalic acid and isophthalic acid or equivalents thereof.

19 Claims, No Drawings

POLYCARBONATE POLYESTER MOLDING COMPOSITION

CROSS REFERENCE TO RELATED APPLICATIONS

This application claims priority to U.S. Provisional Application Ser. No. 60/530,516 filed on Dec. 18, 2003, which is incorporated herein by reference in its entirety.

FIELD OF THE INVENTION

This invention relates to clear bends of polycarbonate and polyester resins.

BACKGROUND OF THE INVENTION

U.S. Pat. No. 5,942,585 to Scott et al relates to clear blends of polycarbonates and polyesters where the polyester comprises a dicarboxylic acid component based on 1,4-cyclohexanedicarboxylic acid units and a glycol component comprising 2,2,4,4-tetramethyl-1,3-cyclobutanediol units. Miscible polycarbonate polyester blends are described in a Free Volume approach to the Mechanical Behaviour of Miscible Polycarbonate Blends, by A. J. Hill et al, J. Phys. Condens. Matter, 8, 3811-3827 (1996) and in Dynamic Mechanical and Dielectric Relaxation Study of Aliphatic Polyester Based Blends by Stack et al., J. M. Polym. Mater. Sci. Eng. (1993), 69, 4-5, Eastman Chemical Company, Kingsport, Tenn. 37662. U.S. Pat. No. 4,879,355 to Light et al relates to a clear polymer blend comprising a glycol copolyester having repeat units from 1,4-cyclohexanedimethanol, terephthalic acid and an alkylene glycol; a polycarbonate resin; and an aromatic polyester having repeat units from terephthalic acid, isophthalic acid and Bisphenol A. U.S. Pat. No. 4,786,692 to Allen et al. relates to a blend of an aromatic polycarbonate and a copolymer derived from a glycol portion comprising 1,4-cyclohexanedimethanol and ethylene glycol. Some of these references describe clear properties of the thermoplastic blends.

U.S. Pat. No. 5,399,661 to Borman et al relates to copolyester compositions which comprise the reaction product of at least one straight chain, branched, or cycloaliphatic C2-C10 alkane diol or a chemical equivalent and a mixture of at least two cycloaliphatic diacids. The diacid mixture comprises predominantly a trans isomer and at least one aromatic diacid. As set forth in column 5, lines 41 to 45, "The reaction is generally run with an excess of the diol component and in the presence of a suitable catalyst ***". U.S. Pat. No. 5,486,562 to Borman et al additionally describes an impact strength modifier for compositions of the type set forth in the '661 patent.

U.S. Pat. No. 4,188,314 to Fox describes the addition of a polyester polymer derived from a cyclohexanedimethanol and a mixture of iso- and terephthalic acid to an aromatic carbonate polymer to enhance the solvent resistance as compared to a polycarbonate article.

Other references include U.S. Pat. Nos. 6,043,322; 6,037,424; 6,011,124; 6,005,059; 5,942,585; 5,194,523; and 5,017,659 and GB 1,559,230A.

Transparent blends of polycarbonate and polyesters may have attractive properties like toughness and chemical resistance. It is desirable to obtain improved properties of optical transparency and good chemical resistance without deleteriously affecting other desirable properties.

SUMMARY OF THE INVENTION

According to an embodiment, a clear thermoplastic blend includes a from about 25 to about 90 percent by weight of low flow non-branched polycarbonate resin having a MVR (Melt Volume Rate) of from about 1 to about 9 cc/10 min at 300° C./1.2 kg, and from about 10 to about 75 percent by weight of a polyester resin derived from the condensation of a cyclohexanedimethanol or equivalent thereof alone or with an ethylene glycol or equivalent thereof with a terephthalic acid or equivalents thereof or a combination of terephthalic acid and isophthalic acid or equivalents thereof. The two components are present in proportions to form a clear blend having a transmission of seventy percent or greater using ASTM D1003. The clarity is measured on the polymer blend prior to the addition of an additive such as mica, pigments, glass, and the like which would affect the light transmission. Elongation at break after exposure to organic materials is significantly improved. Desirable enhanced chemical resistance is provided to the polycarbonate/polyester blend by the addition of up to about 1.0 wt % of the composition styrene-acrylic copolymer with multiple epoxy groups. General beneficial effects can be obtained with quantities of about 0.05 to about 1.0 wt % or quantities such as 0.5 wt %.

According to an embodiment, the blend consisting essentially of the two components with the polycarbonate present in an amount from about 50 to about 80 weight percent based on the total weight of the bend components. Preferably, the polyester component is present in an amount of about 20 to about 50 weight percent based on the total weight of the blend components. More preferably, the polycarbonate is from about 56 to about 80 weight percent and the polyester is from about 20 to about 44 weight percent.

According to an embodiment, desirable enhanced chemical resistance is provided with the addition of polycarbonate having a MVR of about 1 to about 9 and preferably from about 2 to about 7 cc/10 min at 300° C./1.2 kg and more preferably from about 2 to about 5. Enhanced resistance to lipid and isopropanol is observed. The compositions exhibit low color shift after gamma radiation.

The polyester resins are typically obtained through the condensation or ester interchange polymerization of the diol or diol equivalent component with the diacid or diacid chemical equivalent component according to methods known in the prior art. The polycarbonate resin components are prepared according to prior art techniques as referred to herein.

DETAILED DESCRIPTION OF THE INVENTION

For sake of clarity, the following Table 1 sets forth the meaning of the abbreviations used throughout the specification.

TABLE 1

Abbreviations

| Abbreviation | Name |
| --- | --- |
| PC | Polycarbonate |
| CHDM | 1,4-cyclohexanedimethanol (trans/cis mixture) |
| EG | Ethylene glycol |
| TPA | Terephthalic acid |
| IPA | Isophthalic acid |
| PCTG | TPA + 65-99 CHDM + 1-35 EG |
| PCTA | 80-99 TPA + 1-20 IPA + CHDM |
| MVR | Melt Volume Rate |

Surprisingly it was found that by using a low flow PC, the chemical resistance of the blend was enhanced while maintaining processability of the blend.

In an embodiment, the transparent blend includes PC, and PCTG or PCTA. Generally when using PCTA, a lower flow PC in the range and/or a higher load of PC should be employed. When higher amounts of polyesters are employed, e.g., 50 wt % or higher, a low flow PC is generally employed, preferably in combination with an EG containing polyester.

A process for the preparation of transparent/translucent molding composition comprises selecting a blend of low flow PC and PCTG or PCTA within the compositional range of ingredients for imparting clear or transparent properties to the resulting blend and wherein said proportions of ingredients are selected so as to impart improved chemical resistance properties.

According to an embodiment, the PCTG/ PCTA type cycloaliphatic polyesters are condensation products of aromatic diacids, or chemical equivalents and aliphatic diols, or chemical equivalents. The diol component comprises about 50 to 100 mole % CHDM and 0 to about 50 mole % ethylene glycol. Typical diol components for condensation reactions include aliphatic diols, such as alkylene diols containing from 2 to about 10 carbon atoms. The hexacarbocyclic dicarboxylic acids which are condensed with the cyclohexanedimethanol and the alkylene diol, such as ethylene glycol, include terephthalic and isophthalic acids. The acid component or equivalent thereof is preferably from about 75 to 100 mole % terephthalic acid and 0 to about 25 mole % isophthalic acid.

Polycarbonate resins useful in preparing the blends of the present invention are generally aromatic polycarbonate resins.

Typically these are prepared by reacting a dihydric phenol with a carbonate precursor, such as phosgene, a haloformate or a carbonate ester. Generally speaking, such carbonate polymers may be typified as possessing recurring structural units of the formula —O—Ar—O—(CO)—, wherein Ar is a divalent aromatic radical derived from dihydric phenol employed in the polymer producing reaction.

The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2 hydroxyphenyl) methane; bis(4-hydroxyphenyl) methane; bis(4-hydroxy-5-nitrophenyl) methane; 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dimethyl-4-hydroxyphenyl)propane; 2,4'-dihydroxydiphenyl sulfone; 5'-chloro-2,4'-dihydroxydiphenyl sulfone; bis-(4hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonates are disclosed in U.S. Pat. Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Moreover, blends of any of the above materials may be employed in the practice of this invention to provide the aromatic polycarbonate.

The preferred aromatic carbonate for use in the practice in the present invention is a homopolymer, e.g., a homopolymer derived from 2,2-bis(4-hydroxyphenyl)propane (bisphenol-A), commercially available under the trade designation LEXAN Registered™ from General Electric Company.

Preferably a styrene-acrylic copolymer is utilized for additional enhanced chemical resistance. The polymer is based on oligomer with styrene and acrylate building blocks polymerized in solvent and which have desirable glycidyl groups incorporated as side chains. The polymerization is carried out in continuous stirred tank reactor. High number of epoxy groups per oligomer chain is desired, around 10, preferably greater than about 15, and more preferably greater than about 20. The epoxy-containing polymer is preferably utilized in polycarbonate polyester blends in absence of a catalyst such as a sodium stearate type of catalyst. Apart from having excellent hydro stability, these blends surprisingly have excellent clarity, as measured by excellent percent transmission. According to an embodiment, the epoxy containing material has a molecular weight greater than about 3000, preferably greater than about 4000, and more preferably greater than about 6,000. According to an embodiment, the epoxy containing material includes styrenic and acrylic groups. Various types of epoxy-based materials have been used in this current study, such as ECN 1299(an epoxy cresol novolac resin), Joncryl ADR 4368 (a styreno-acrylate based oligomer with epoxy functionality), Joncryl ADR 4300, epoxydized soybean oil etc. "Joncryl" polymers are available from Johnson Polymer, Sturtevant, Wis. The epoxy functionality may react with end groups to introduce chain extension in the system, as evident from MVR decreases. These epoxy containing polymer blends can maintain the clarity of the blend above about 70% transmission.

Additionally, additives such as antioxidants, thermal stabilizers, mold release agents, antistatic agents, whitening agents, colorants, plasticizers, minerals such as talc, clay, mica, barite, wollastonite and other stabilizers including but not limited to UV stabilizers, such as benzotriazole, supplemental reinforcing fillers such as flaked or milled glass, and the like, flame retardants, pigments, additional resins or combinations thereof may be added to the compositions of the present invention. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl) phosphite, tris-(mixed mono- and di-nonylphenyl)phosphite, dimethylbenzene phosphonate and trimethyl phosphate. Examples of antioxidants include octadecyl-3-(3, 5-di-tert-butyl-4-hydroxyphenyl)propionate, and pentaerythrityl-tetrakis [3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzenesulfonate.

A preferred class of stabilizers including quenchers are those which provide a transparent/translucent and colorless product. Typically, such stabilizers are used at a level of 0.001-10 weight percent and preferably at a level of from 0.005-2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

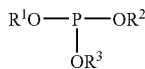

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

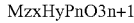

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Examples of mold releasing agents include pentaerythritol tetrastearate, stearyl stearate, beeswax, montan wax, and paraffin wax. Combinations of any of the foregoing additives may be used. Such additives may be mixed at a suitable time during the mixing of the components for forming the composition.

Furthermore, diols and/or polyols, including 2-methyl-2,4-pentanediol and poly(propylene glycol), may be added to the compositions of the present invention. These additives are known to be able to further decrease the yellowing of the polycarbonate and polyester blends upon gamma irradiation. However, such diols and/or polyols can reduce chemical resistance of the blend, see Table 2.

The production of the compositions may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device. The examples are compounded using a twin screw type extruder, where the mean residence time of the material is from about 20 s to about 30 s, and where the temperature of the different extruder zones is from about 230° C. to about 290° C.

The glass transition temperature of the preferred blend is from about 80° C. to about 150° C., more preferably from about 90° C. to about 140° C.

The low color shift upon gamma radiation, a typical sterilization method, and resistance to a broad range of chemicals make it suitable for use in medical, pharmaceutical, and food industries, especially fluid delivery, drug delivery, surgical devices, blood care, renal care, home diagnostics, lab ware, trays, hospital device housing, animal care, pharmaceutical packaging, food packaging, and the like.

The composition may be shaped into a final article by various techniques known in the art such as injection molding, extrusion, injection blow molding, gas assist blow molding, or vacuum forming.

EXAMPLES

The following examples employed the materials listed in Table 2. All amounts are weight percents based on the total weight of the composition unless otherwise indicated. All ingredients were mixed in a ribbon blender and extruded on a Werner-Pleiderer twin screw extruder at 260° C. to form pellets. The pellets were then fed into an injection molding machine to mold discs-test bars.

Test Procedures

Optical properties (yellowness index (YI) and transmission) are measured according ASTM D1003 with 3.2 mm thick plaques.

Color shift (dYI) is determined by measuring the YI difference of a 3.2 mm thick plaque pre- and post-gamma radiation. The YI post-gamma is measured at 1 week after the completion of radiation. Typical gamma dose ranges from 25 kGy (kiloGray) to 75 kGy.

From the granulate, the melt volume rate (MVR) was measured according ISO 1133 (300° C./1.2 kg, unless otherwise stated) in units of cm³/10 min.

Chemical Resistance: Chemical resistance against various organic materials is studied. A composition having 10% safflower oil, 10% soybean oil, 1.2% egg phosphatides, 2.5% glycerin, buffered to pH 8.3 in water is tested. The test is carried out according to ISO 4599. The following test conditions are used: Duration of the test: 96 hours; Test temperature: 23° C.; Applied constant strain: 1.5%. The method of contact: saturated tissue on the middle part of tensile bars. After the test the tensile bars are inspected visually on change in appearance according to the following classification: A. No change; B. Crazes and/or cracks; C. Broken. After the visual inspection the tensile test procedure according to the ASTM D638 standard was performed to determine the physical properties. The sample is considered compatible to the chemical (or resistant to the chemical) if the tensile elongation retention is equal or above 80%; considered marginal if the tensile elongation retention is between 65 and 79%; and considered incompatible if the tensile elongation retention is below 64%. Using 70% isopropyl alcohol (IPA) in water, the same procedure described above is followed except the duration is 72 hours for the elongation and visual observation.

Tensile Elongation: the ability of a material to resist breaking under tensile stress is based upon ASTM D638. Samples are generally injection molded. The tensile testing machine pulls the sample from both ends and measures the force required to pull the specimen apart and how much the sample stretches before breaking. The ultimate elongation of a plastic is the percentage increase in length that occurs before it breaks under tension.

The Table below provides the test results showing the superiority of the invention compositions. Compositions within the claimed range of MVR and also polycarbonate and polyester provide good chemical resistance as opposed to compositions outside, for instances, examples 7 and 13. All compositions exhibit lower YI shift after gamma radiation than typical radiation-stabilized polycarbonate, for example of Makrolon Rx1805 that yields a YI shift of 10.5 under the same condition. Color shift is preferable less than about 6, more preferably less than about 5.

What is claimed is:

1. A composition comprising a clear thermoplastic blend of:
   (a) from about 25 to about 90 percent by weight of low flow polycarbonate resin having a MVR ranging from about 1 to about 9 cc/10 min at 300° C./1.2 kg;
   (b) from about 10 to about 75 percent by weight of a polyester resin derived from the condensation of a cyclohexanedimethanol or equivalent thereof alone or with an ethylene glycol or equivalent thereof with a terephthalic acid or equivalents thereof or a combination of terephthalic acid and isophthalic acid or equivalents thereof, and
   (c) a styrene-acrylic copolymer having multiple epoxy groups.

2. The composition of claim 1, wherein the styrene-acrylic copolymer is present in an amount ranging from about 0.05 to about 1.0 wt % of the blend.

3. The composition of claim 2, wherein the low flow polycarbonate resin and the polyester resin are present in proportions to form a clear blend having a transmission of seventy percent or greater and an elongation at break after exposure to organic material of 65% or greater.

4. The composition of claim 3, wherein the enhanced chemical resistance is provided to the polycarbonate/polyester blend by the addition of from about 0.05 to about 1.0 wt % of the composition of an styrene-acrylic copolymer having multiple epoxy groups.

5. The composition of claim 4, wherein the blend comprises the two resins with the polycarbonate present in an amount from about 50 to about 80 percent by weight based on the total weight of the blend.

TABLE 2

| | | | Polyester | | | | | Results | | | | |
| | | | Eastar PCTG 10179* | Eastar PCTA A150** | ADR 4368 | Gamma stabilizer | YI shift post 25 kGy Gamma radiation | Oil resistance | | 70% IPA resistance | | |
| | PC | | | | | | | Elongation | Visual | Elongation | Visual | Transmission |
| Example # | MVR | wt % | (wt %) | (wt %) | (wt %) | | | retention (%) | rating | retention (%) | rating | (%) |
|---|---|---|---|---|---|---|---|---|---|---|---|---|
| 1 | 2.7 | 74.6% | 25% | | | | 4.8 | 129% | A | 102% | B | 88% |
| 2 | 2.7 | 49.6% | 50% | | | | 2.2 | 96% | A | 130% | B | 88% |
| 3 | 2.7 | 24.6% | 75% | | | | 1.6 | 93% | A | 9% | B | 88% |
| 4 | 6.8 | 74.6% | 25% | | | | 4.6 | 65% | A | 65% | B | 87% |
| 5 | 6.8 | 49.6% | 50% | | | | 2.4 | 68% | A | 28% | B | 86% |
| 6 | 6.8 | 24.6% | 75% | | | | 1.9 | 120% | A | 6% | B | 87% |
| 7 | 11.5 | 73.2% | 26.3% | | | | 3.9 | 5% | A | 8% | B | 88% |
| 8 | 2.7 | 74.5% | 25% | | 0.10% | | 5.6 | 125% | A | 127% | B | 86% |
| 9 | 2.7 | 74.1% | 25% | | 0.50% | | 4.8 | 118% | A | 118% | B | 88% |
| 10 | 2.7 | 49.5% | 50% | | 0.10% | | 3 | 113% | A | 80% | B | 88% |
| 11 | 2.7 | 49.1% | 50% | | 0.50% | | 3 | 135% | A | 117% | B | 87% |
| 12 | 6.8 | 74.5% | 25% | | 0.10% | | 5.1 | 102% | A | 65% | B | 88% |
| 13 | 11.5 | 72.2% | 26.3% | | 1% | | | 7% | A | 12% | B | |
| 14 | 2.7 | 49.4% | 50% | | 0.10% | I[1] | 1.2 | 94% | A | 40% | B | 87% |
| 15 | 2.7 | 49.2% | 50% | | 0.10% | II[2] | 1.2 | 91% | A | 7% | B | 88% |
| 16 | 2.7 | 69.6% | | 30% | | | 5.6 | 84% | A | 109% | B | 87% |
| 17 | 2.7 | 49.6% | | 50% | | | 1.3 | 94% | A | 16% | B | 87% |
| 18 | 2.7 | 24.6% | | 75% | | | 1.4 | 75% | A | 91% | B | 87% |

*100% terephthalate and 80 mole % CHDM + 20 mole % EG
**83 mole % terephthalate + 17 mole % isophthalate and 100% CHDM
[1]I: 0.1 wt % 2-Methyl-2,4-pentanediol
[2]II: 0.33 wt % Poly(propyleneglycol)
Compositions within the claimed range of MVR and also polycarbonate and polyester provide good chemical resistance as opposed to compositions outside, for instances, examples 7 and 13.

6. The composition of claim 5, wherein the blend comprises the two resins wherein the polyester component is present in an amount of about 20 to about 50 weight percent based on the total weight of the blend.

7. The composition of claim 6, wherein the polycarbonate has a MVR of about 2 to about 9 cc/10 min at 300° C./1.2 kg.

8. The composition of claim 7, wherein the blend exhibits low color shift after gamma radiation.

9. A shaped article comprising the composition of claim 1.

10. A shaped article comprising the composition of claim 2.

11. A composition comprising clear thermoplastic blend comprising:
   (a) from about 25 to about 90 percent by weight of low flow polycarbonate resin having a MVR (Melt Viscosity Rate) of from about 1 to about 9 cc/10 min at 300° C./1.2 kg;
   (b) from about 10 to about 75 percent by weight of a polyester resin derived from the condensation of a cyclohexanedimethanol or equivalent thereof alone or with an ethylene glycol or equivalent thereof with a terephthalic acid or equivalents thereof or a combination of terephthalic acid and isophthalic acid or equivalents thereof,
   (c) a styrene-acrylic copolymer having multiple epoxy groups in an amount ranging from about 0.05 to about 1.0 wt % of the blend;
   (d) an additive selected from the group consisting of antioxidants, thermal stabilizers, mold release agents, antistatic agents, whitening agents, colorants, plasticizers, minerals, supplemental reinforcing fillers, flame retardants, pigments, additional resins, and combinations thereof.

12. The composition of claim 11, wherein the additive is a stabilizer selected from the group consisting of UV stabilizers, thermal stabilizers, and combinations thereof.

13. The composition of claim 12, wherein the low flow polycarbonate resin and the polyester resin are present in proportions to form a clear blend having a transmission of seventy percent or greater and an elongation at break after exposure to organic material of 65% or greater.

14. The composition of claim 11, wherein the enhanced chemical resistance is provided to the polycarbonate/polyester blend by the addition of from about 0.05 to about 1.0 wt % of the composition of an styrene-acrylic copolymer having multiple epoxy groups.

15. The composition of claim 11, wherein the blend comprises the two resins with the polycarbonate present in an amount from about 50 to about 80 percent by weight based on the total weight of the blend.

16. The composition of claim 11, wherein the blend comprises the two resins wherein the polyester component is present in an amount of about 20 to about 50 weight percent based on the total weight of the blend.

17. The composition of claim 11, wherein the polycarbonate has an MVR of about 2 to about 9 cc/10 min at 300°0 C./1.2 kg.

18. The composition of claim 11, wherein the blend exhibits low color shift after gamma radiation.

19. A composition comprising a clear thermoplastic blend of:
   (a) from about 50 to about 80 percent by weight of low flow polycarbonate resin having a MVR ranging from about 1 to about 9 cc/10 min at 300° C./1.2 kg;
   (b) from about 20 to about 50 percent by weight of a polyester resin derived from the condensation of a cyclohexanedimethanol or equivalent thereof alone or with an ethylene glycol or equivalent thereof with a terephthalic acid or equivalents thereof or a combination of terephthalic acid and isophthalic acid or equivalents thereof, and
   (c) a styrene-acrylic copolymer having multiple epoxy groups, the styrene-acrylic copolymer present ranging from about 0.05 to about 1 wt % of the blend;
   wherein the low flow polycarbonate resin and the polyester resin are present in proportions to form a clear blend having a transmission of seventy percent or greater and an elongation at break after exposure to organic material of 65% or greater; and
   wherein the blend exhibits low color shift after gamma radiation.

* * * * *